Nov. 26, 1963 A. MORA 3,111,675
GOGGLES FOR PROTECTION AGAINST GLARE IN DRIVING AT NIGHT
Filed June 10, 1960
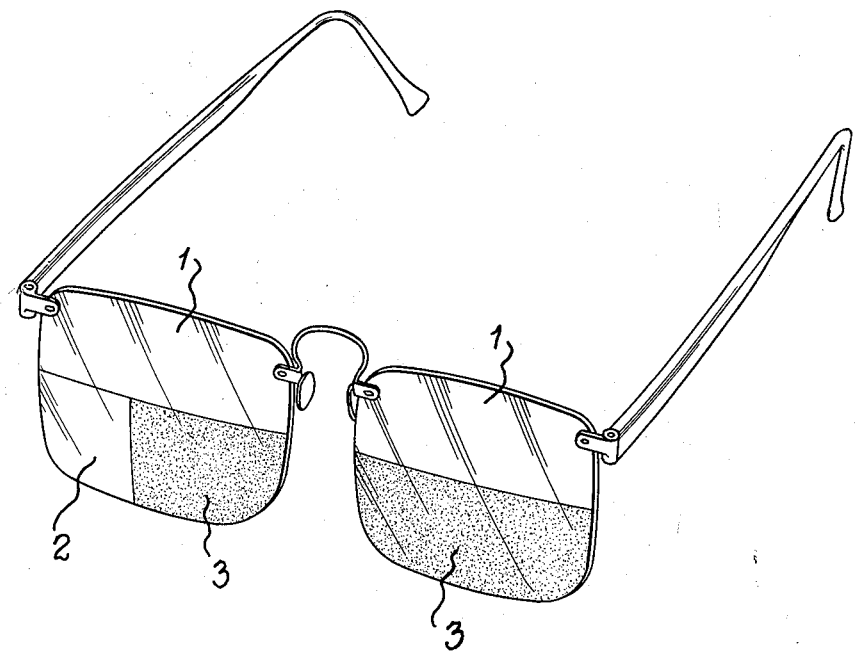
INVENTOR.
ANTONIO MORA
BY
*Benj. T. Rauber*
HIS ATTORNEY

3,111,675
GOGGLES FOR PROTECTION AGAINST GLARE IN DRIVING AT NIGHT
Antonio Mora, 32—53 72nd St., Jackson Heights, N.Y.
Filed June 10, 1960, Ser. No. 35,294
2 Claims. (Cl. 2—14)

My invention relates to goggles to protect a driver of a vehicle from momentary blindness or impairment of vision by the glare of an approaching headlight. Such loss or impairment of vision may lead to the danger that the driver may be unable to see his position on the road and consequently may lead to the danger of a collision.

My invention provides goggles in which the glare of an oncoming headlight may be avoided or reduced to such an extent as to be innocuous and yet permit clear and unimpeded vision of the edge of the road either to the right or to the left.

In the goggles of my invention the upper part, or approximately the upper half of the lenses of the goggles is of tranparent material and the lower part or lower half is provided with a part at the right, or left, which similarly is clear and transparent while the remaining portion of the lower half is sufficiently light absorbing to obviate glare. The wearer of the goggles looks through the upper half in normal driving. When facing an oncoming headlight he looks through the lower half and turns his eyes to look through the clear part to see the side of the road. There is no glare from the side of the road as the light from this direction is only reflected light. The light absorbent property of the remaining portion of the lower part protects the wearer from the glare of the headlight.

The light absorbing portion of the lens may be made of a glass or plastic of high light absorbing property or a tinted or polarizing material or it may be of a glass of the same transparency as the other parts and coated with a light absorbing material. If a tinted glass or film is used an amber tint is to be preferred. The clear portion of the lower half of the lens may be cut out as its function is to permit clear vision of the side of the roadway.

An embodiment of my invention is shown by way of example in the accompanying drawing which shows a perspective view of a pair of goggles according to my invention.

In the embodiment shown in the drawing each lens comprises an upper zone half 1 of clear transparent glass, plastic or other material. The lower half of one lens, which may be designated as the first lens, comprises a clear transparent portion 2 and a tinted or other light absorbing portion 3. The lower half of the other lens, which may be designated as the second lens, is light absorbing throughout its area. In the embodiment shown the left lens is provided with the clear portion and is suited for countries in which cars are driven in the left side of center. For cars driven on the right side the clear portion 2 would be in the right lens. It is to be understood that the light absorbing portions do not absorb all of the light but only a part thereof sufficient to permit some light from a headlight to pass through but excluding sufficient to avoid glare. For drivers not requiring a special lens for driving the lenses may be of plane plates or rounded. For drivers requiring special lenses the lenses may be ground to meet the requirements of the driver.

In using the goggles, the driver will normally use the upper part. However, when confronted with the glare of an oncoming headlight he will lower his eyes to use the lower half and turn them to see through the clear portion 2. The direct light or glare of the headlight will be at an angle from the side opposite the clear portion and will thus come through the light absorbing portions 3 and will be shielded from the vision of the wearer.

Having described my invention, I claim:
1. Goggles for night driving which comprises a first lens and a second lens each lens being clear and transparent above a horizontal line, the area below said horizontal line in said first lens being light absorbing to reduce glare, the area below the horizontal line of said second lens being light absorbing to reduce glare in approximately the half nearest said first lens and being clear and transparent in the remaining portion of said area below said horizontal line.
2. The goggles of claim 1 in which the light absorbing portion of each lens is tinted.

References Cited in the file of this patent
UNITED STATES PATENTS

| | | |
|---|---|---|
| 1,095,543 | Barr | May 5, 1914 |
| 1,320,931 | Rutledge | Nov. 4, 1919 |
| 1,584,041 | Shaver | May 11, 1926 |
| 1,637,406 | Brumder | Aug. 2, 1927 |